US009601926B2

(12) United States Patent
Larsson et al.

(10) Patent No.: US 9,601,926 B2
(45) Date of Patent: Mar. 21, 2017

(54) MULTI TERMINAL HVDC CONTROL

(71) Applicant: ABB RESEARCH LTD, Zürich (CH)

(72) Inventors: Mats Larsson, Baden-Dättwil (CH); Stefan Thorburn, Västerås (SE); Bertil Berggren, Västerås (SE)

(73) Assignee: ABB Research LTD, Zurich (CH)

( * ) Notice: Subject to any disclaimer, the term of this patent is extended or adjusted under 35 U.S.C. 154(b) by 140 days.

(21) Appl. No.: 14/597,922

(22) Filed: Jan. 15, 2015

(65) Prior Publication Data

US 2015/0131342 A1  May 14, 2015

Related U.S. Application Data

(63) Continuation of application No. PCT/EP2013/064995, filed on Jul. 16, 2013.

(30) Foreign Application Priority Data

Jul. 17, 2012  (EP) .................................. 12176685

(51) Int. Cl.
*H02J 3/36* (2006.01)
*H02M 5/42* (2006.01)
(Continued)

(52) U.S. Cl.
CPC .................. *H02J 3/36* (2013.01); *H02M 5/42* (2013.01); *H02M 7/7575* (2013.01); *H02J 2003/007* (2013.01); *Y02E 60/60* (2013.01)

(58) Field of Classification Search
CPC ............ H02M 1/32; H02M 5/40; H02M 5/42; H02M 5/458; H02M 5/4585; H02M 7/7575; H02J 2003/007; H02J 3/36
See application file for complete search history.

(56) References Cited

U.S. PATENT DOCUMENTS 5,742,795 A   4/1998  Kussel
7,092,798 B2  8/2006  Mansingh et al.
(Continued)

FOREIGN PATENT DOCUMENTS

EP  0 715 266 A2  6/1996
WO  WO 2009/016113 A1  2/2009
(Continued)

OTHER PUBLICATIONS

International Search Report (PCT/ISA/210) mailed on Mar. 20, 2014, by the European Patent Office as the International Searching Authority for International Application No. PCT/EP2013/064995.
(Continued)

*Primary Examiner* — Fred E Finch, III
(74) *Attorney, Agent, or Firm* — Taft Stettinius & Hollister LLP

(57) ABSTRACT

An exemplary Multi-Terminal High Voltage Direct Current (MTDC) system includes at least three terminals, where each terminal including a Voltage Source Converter (VSC) controlled by a VSC controller. A method for controlling the MTDC system includes providing a converter schedule including at least one of a desired power flow value and a DC voltage; determining, by a MTDC master controller, a present state of the MTDC system including a dynamic topology of the MTDC system; determining, by the MTDC master controller, based on the present state of the MTDC system, based on the schedule and based on MTDC system constraints, VSC controller parameters including droop settings for local control by the VSC controllers; and transmitting the VSC controller parameters to the VSC controllers.

21 Claims, 2 Drawing Sheets

(51) Int. Cl.
H02M 7/757 (2006.01)
H02J 3/00 (2006.01)

(56) References Cited

U.S. PATENT DOCUMENTS

| | | | |
|---|---|---|---|
| 2004/0264083 | A1 | 12/2004 | Mansingh et al. |
| 2009/0193077 | A1 | 7/2009 | Horii et al. |
| 2011/0282508 | A1* | 11/2011 | Goutard .................. H04L 63/20 700/293 |
| 2012/0033461 | A1 | 2/2012 | Papafotiou et al. |
| 2013/0041520 | A1* | 2/2013 | Chetty ...................... H02J 3/36 700/297 |
| 2013/0334887 | A1* | 12/2013 | Linden ..................... H02J 1/12 307/82 |
| 2014/0303918 | A1* | 10/2014 | Larsson ................... H02J 3/24 702/75 |

FOREIGN PATENT DOCUMENTS

| | | |
|---|---|---|
| WO | WO 2010/086071 A1 | 8/2010 |
| WO | WO 2012/044369 A1 | 4/2012 |

OTHER PUBLICATIONS

Written Opinion (PCT/ISA/237) mailed on Mar. 20, 2014, by the European Patent Office as the International Searching Authority for International Application No. PCT/EP2013/064995.

European Search Report mailed on Dec. 20, 2012 for Application No. 12176685.1.

K. Meah et al., "A New Simplified Adaptive Control Scheme for Multi-Terminal HVDC Transmittsion Systems", International Journal of Electrical Power & Energy Systems, vol. 32, No. 4, May 1, 2010, XP-026906056.

Weixing Lu et al., "DC Voltage Limit Compliance in Voltage-Source Converter Based Multi-Terminal HVDC", Power Engineering Society General Meeting, Jun. 12-16, 2005, pp. 1322-1327, XP-01082591.

International Preliminary Report on Patentability (Form PCT/IB/373) and the Written Opinion of the International Searching Authority (Form PCT/ISA/237) issued on Jan. 20, 2015, by the International Bureau of WIPO in corresponding International Application No. PCT/EP2013/064995. (7 pages).

\* cited by examiner

MULTI TERMINAL HVDC CONTROL

RELATED APPLICATION(S)

This application claims priority under 35 U.S.C. §120 to International application no. PCT/EP2013/064995 filed on Jul. 16, 2013, designating the U.S., and claiming priority to European application no. 12176685.1 filed in Europe on Jul. 17, 2012. The content of each prior application is hereby incorporated by reference in its entirety.

FIELD

The disclosure relates to the field of Voltage Source Converter based Multi Terminal High Voltage Direct Current systems, and specifically to a method of and a master controller for controlling operation of such systems.

BACKGROUND INFORMATION

A known approach in controlling a Voltage Source Converter (VSC) based High Voltage Direct Current (HVDC) terminal for two-terminal, or point-to-point operation can include a three layer hierarchical control system with the following layers:

A firing control layer that generates firing pulses to the individual valves in the converter bridges. A common method for firing control is Pulse Width Modulation (PWM) using a reference sine wave. This enables control of the AC voltage magnitude and phase angle of the converter AC terminal to specified reference values.

A Converter unit control layer that generates the reference values for the converter AC voltage magnitude and phase angle to control the current through the converter to specified reference values generated by the system control. Limiter action is introduced to limit the voltage magnitude of the converter AC voltage to an allowed operating range.

A system control layer when applied in a point to point connection can have one terminal set to control DC voltage and the other terminal set to control DC current or an AC bus power reference. Additionally another controller can change the converter AC voltage magnitude reference value to control either the AC reactive power injection by the converter station Point of Common Coupling (PCC) or the AC voltage magnitude at PCC. The system control layer can be implemented as an array of cascaded PI-controllers with various internal limiters. Limiter action is also introduced on the output of the system control to limit the converter AC and/or DC current to an allowed operating range.

This three layer control system or modified forms thereof can be referred to as "VSC controller" or "local station control" in the following.

In Multi-Terminal HVDC (MTDC) systems with at least three terminals or converter stations interconnected by a DC grid known system controls as described above can be inadequate since the control is incapable of maintaining stability and balancing the load among remaining converters following severe disturbances in the MTDC system including failure of one of the converter stations and ensuing protective action. For example, failure of the DC voltage controlling terminal often causes the control systems of the remaining converters to go into limitation, and while the MTDC system can still operate, the controllability of the power flow is lost.

As a remedy, so-called droop control schemes introducing a droop constant k in a droop characteristic between the actual DC power $P_{DC}$ and DC voltage $V_{DC}$ in the system control layer have been devised in order to achieve stability of the individual VSC control also in multi-terminal operation. In such droop control schemes the local station controller no longer enforces perfect reference tracking, e.g., a perfect match of $P_{DC}$ to $P_{ref}$ in steady-state. This is advantageous since it ensures stability of the local station controllers also in multi-terminal operation. An exemplary droop characteristic reads $P_{DC}=P_{ref}+k^*(V_{DC}-V_{ref})$, illustrating that $P_{DC}$ is allowed to deviate from a reference power $P_{ref}$ by a stationary error dependent on the droop constant k. Hence, instead of individually setting the values of the set-points $P_{ref}$ strictly equal to scheduled power flows $P_{sched}$ and hoping for the best when it comes to the actual schedule deviations, e.g. in case of outage of a cable or converter station, the use of a droop scheme allows a distribution of the schedule deviations over several terminals. However, droop control does not provide any way of guarding against overload of individual DC cables. Furthermore, it is difficult to tune the droop control schemes to provide a satisfactory load redistribution following converter outages or islanding in DC grids of a larger size and/or complex topology.

Control systems inherently include control system limits implying e.g., that a DC voltage set-point does not exceed a maximum allowed DC voltage which in turn depends on the insulation capabilities of the DC lines. Controllers can become less reliable or robust when approaching their controller limits and/or even tend to saturate if expected to operate too far off an initially devised safe operating regime corresponding to some underlying physical constraints. Initial simulation results for MTDC systems have now shown that there is even a possibility for harmful interaction between limiters in the system control layers and limiters in the converter unit control layers. While the behaviour of the P- and PI controllers in a control system is straightforward to analyse and tune for example using eigenvalue or modal analysis techniques, the behaviour of their associated limiters is far less explored.

A paper by Lu, W and Ooi, B. T. entitled "DC Voltage Limit Compliance in Voltage-Source Converter based Multi-Terminal HVDC", IEEE PES General Meeting 2005, pp. 1322-1327, discloses a way of controlling steady-state DC bus voltages by pre-calculating and activating reference set-points that can be adapted to accidental loss of any one converter. In situations where the dc transmission distances can be long and the converter powers can be large, the set-points can be re-adjusted in an iterative manner until the voltage margins can be satisfied. This problem is formulated as optimization of a cost function, which is then solved by the Lagrange Multiplier method, subject to both voltage and power constraints.

The patent application WO2010/086071 is directed to a High Voltage Direct Current (HVDC) link with Voltage Source Converters (VSC) and interconnecting two power systems. A model-predictive control with a receding horizon policy is employed in the outer loop of a two-loop or two-layer control scheme for the HVDC link. While optimum converter current reference values can be passed from the outer to the inner loop, the control parameters of the inner loop remain unchanged. The two-loop control scheme takes advantage of the difference in speed of the dynamics of the various system variables of the HVDC link and the interconnected power systems. Model-based prediction representative of the interconnected power systems' behaviour allows comparing the future effect of different control inputs applied within the control scheme, while taking into account any physical, safety and operating constraints.

The patent application WO2012/044369 discloses a central application for coordinated control of Multi-Terminal HVDC Systems, simultaneously generating set-points for a VSC HVDC grid by solving an Optimum Power Flow (OPF) problem. The proposed solution disregards any constraints or limits, the latter have to be verified subsequently on the working system.

SUMMARY

An exemplary method of controlling a Multi-Terminal High Voltage Direct Current (MTDC) system with at least three terminals, each terminal including a Voltage Source Converter (VSC) controlled by a VSC controller is disclosed, comprising: providing a converter schedule including at least one of a desired power flow value and a DC voltage; determining, by a MTDC master controller, a present state of the MTDC system including a dynamic topology of the MTDC system; determining, by the MTDC master controller, based on the present state of the MTDC system, based on the schedule and based on MTDC system constraints, VSC controller parameters including droop settings for local control by the VSC controllers; and transmitting the VSC controller parameters to the VSC controllers.

An MTDC master controller for controlling a Multi-Terminal High Voltage Direct Current (MTDC) system with at least three terminals, each terminal including a Voltage Source Converter (VSC) controlled by a VSC controller is disclosed, the MTDC being configured to: determine a present state of the MTDC system including a dynamic topology of the MTDC system; determine VSC controller settings based on the present state of the MTDC system, a converter schedule including desired power flow values, MTDC system constraints; and transmit the settings to the VSC controllers.

BRIEF DESCRIPTION OF THE DRAWINGS

The subject matter of the disclosure will be explained in more detail in the following text with reference to preferred exemplary embodiments which can be illustrated in the attached drawings, in which.

DETAILED DESCRIPTION

Figure 1:
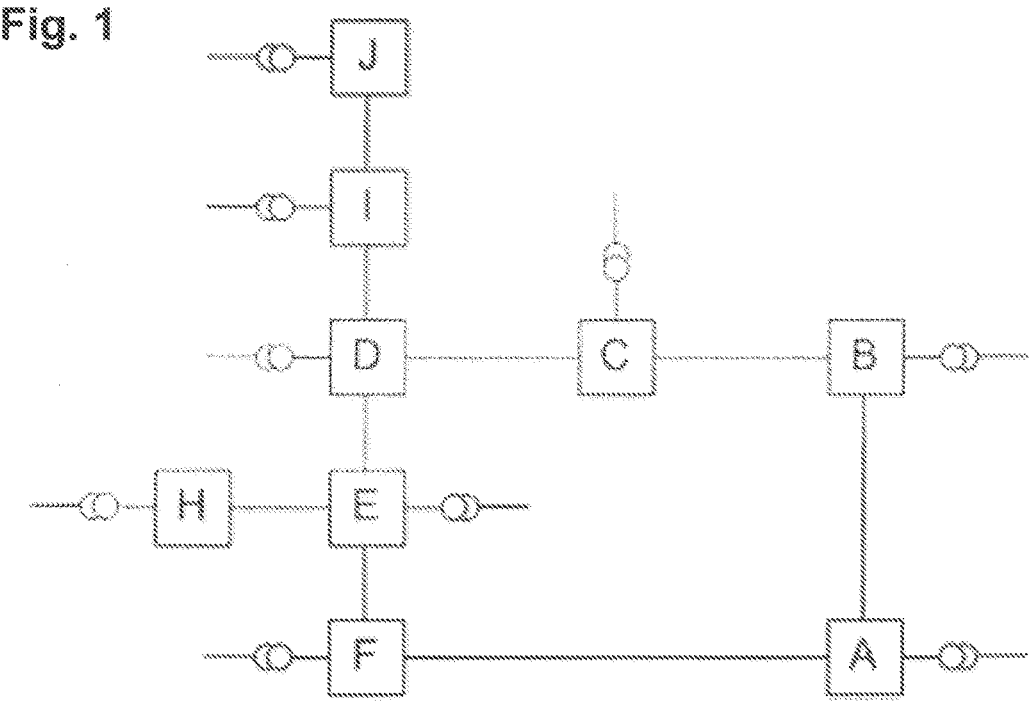
FIG. 1 schematically shows an MTDC system with nine terminals in accordance with an exemplary embodiment of the present disclosure.

Exemplary embodiments of the present disclosure avoid or reduce inter-controller interaction due to imposed individual controller limits in Voltage Source Converter (VSC) based Multi-Terminal High Voltage Direct Current (MTDC) systems.

According to an exemplary embodiment of the present disclosure, a master control system layer is introduced into MTDC control for executing advanced control strategies that leverage some of the flexibility offered by VSC based HVDC systems. The master control reverts to mathematical optimization and dynamic modeling of the system including controller limits to generate optimized controller settings adapted to a present state of the system. In an exemplary embodiment, preferable controller settings include recalculated converter reference values with a mitigated risk of trespassing corresponding converter limits and a reduction in adverse limiter interaction. The controller settings can be ultimately distributed or dispatched to the local control levels.

Specifically, an MTDC system with at least three terminals interconnected by a DC grid including a plurality of DC links, wherein the terminals can be individually coupled to AC equipment and/or AC grids and wherein each terminal includes a VSC arranged between a Point of Common Coupling (PCC) and a DC bus bar, said VSC being controlled by a local, multilevel VSC controller, is controlled by a method including the following steps: providing, by an operator or a Supervisory Control And Data Acquisition (SCADA) system or an Energy Management System (EMS), a DC power transmission converter schedule including a desired or scheduled power flow value for each terminal of the MTDC system and/or a DC voltage, determining, by the MTDC master controller and based on actual operational data or measurements provided by the VSC controllers and/or additional sensors in suitable locations of the MTDC system in the form of binary switching device status information or discrete transformer tap changer positions, a present state of the MTDC system including a dynamic topology of the MTDC system, determining, by the MTDC master controller, based on the present state of the MTDC system, based on the converter schedule, and based on system constraints including operational limits of the MTDC system, updated VSC controller settings including set-points, or reference values, and controller parameters such as droop constants or gains for lower level closed loop control systems, and transmitting the updated VSC controller settings to the VSC controllers and operating the VSC controllers accordingly.

In an exemplary embodiment of the disclosure, a current state of the MTDC systems includes indications about a load status, including e.g. a load margin and a thermal capacity, of individual DC cables or overhead lines of the DC grid. That is, in addition to binary switching device status information continuous operating information such as currents and temperature of selected lines need to be communicated. The load status is then taken into account in a thermal estimation or prediction model of the cable or overhead line temperature, to manage a thermal overload capacity of the DC links.

In an advantageous variant of the disclosure, the updated VSC controller settings can be determined by through model based control involving a real-time model of the MTDC system. In addition, AC equipment and/or AC grids coupled to the MTDC system can be included in the model as well, permitting to evaluate an interaction of the MTDC system with the surrounding AC network, specifically through the modelling of AC limits of the AC equipment and/or AC grids in an optimization procedure. For example, Model Predictive Control (MPC) can be employed, with the converter schedule as a performance objective, thus minimizing any stationary error. MPC includes predictions of the effect of control actions on the system state evolution and predictions of future operating conditions in the optimization procedure.

In an exemplary embodiment, the master control layer can have a response time that is significantly faster than known SCADA/EMS scan rates and correspondingly can have an update rate of 30 seconds or less. Reaction to power production fluctuations on a scale of minutes as incurred by wind farms is thus possible in due time. On the other hand, dispatch of new controller settings can occur as frequent as the cycle time of the local station controls, and even faster if appropriate. In an exemplary embodiment, the response time of the master control layer can be in the range of 0.2-5 seconds.

According to another exemplary embodiment of the present disclosure, the master control layer is employed to evaluate the effect of any credible, single-component-failure-type contingency based on actual operating conditions, and worst case schedule deviations or constraint violations can be reported to an operator or a SCADA/EMS system supervising the DC grid. For example, the outage of converters or cables in the DC part of the power system can trigger power oscillations, frequency instability or voltage collapse within an adjacent AC network.

Furthermore, pre-computation of adapted set-points and/or station controller parameter values for each credible contingency can be performed in advance and based on actual operating conditions. Following detection of one of the anticipated contingencies having actually occurred, the pre-computed set-points and parameter values can be distributed or deployed rapidly, e.g. within 100 ms or less, and remedial actions based on the adapted set-points and parameter values can rapidly come into effect.

Exemplary embodiments of the present disclosure are applicable to known topologies of the MTDC grid, including meshed topologies and isolated islands, and its benefits become specifically apparent in MTDC systems with five or more terminals where management of all possible different operating condition can lead to unacceptable engineering efforts if only simple feedback control loops are used. The disclosure includes mathematical optimization procedures to determine, in real-time and based on actual operating conditions, controller settings that minimize a cost criterion or optimize any other objective function. Controller settings include set-points or reference values as well as controller parameters such as droop constants or gains. Furthermore, it introduces model predictive control to include predictions of the effect of control actions on the system state evolution and predictions of future operating conditions in the optimization procedure.

The master control system layer according to aspects of the disclosure ultimately ensures that following disturbances and possible protection actions the MTDC system can operate in a preferable and feasible operating point, given constraints on DC voltage level, branch capacities and converter injections. It mitigates adverse limiter interaction and manages thermal overload capability of the DC grid.

The functionality of the novel master control system can be specified in terms of one or more of the following performance objectives: a) Keep converter power injections close to scheduled values from SCADA/EMS; b) Maintain healthy average DC voltage profile while minimizing DC losses; c) Keep AC voltages close to scheduled values; d) Minimize DC/AC or combined system losses, while fulfilling one or more of the following types operational constraints; e) Converter and DC grid voltage limits; f) Converter capability DC current limits; g) DC link current limits; h) Cable or overhead line permanent temperatures; i) AC system voltage V and active P/reactive Q power capability limits; j) Converter internal control system limits (e.g., PWM modulation index limits); k) Transformer tap changer ratio limits.

The above operational constraints, including control system limits, can be taken into account as additional penalty terms in an objective function used by the mathematical optimization procedure when determining the current, voltage and/or power reference values and/or VSC controller parameter values such as droop constants for the local station VSC controls.

FIG. 1 schematically shows an MTDC system with nine terminals in accordance with an exemplary embodiment of the present disclosure. Namely, FIG. 1 shows an exemplary MTDC system with nine converter stations, terminals, or nodes A to F and H to J interconnected by nine HVDC links. In order to enable communication of MTDC system state information, the converter stations, as well as numerous other locations in the MTDC system can be interconnected by a suitable communication system (not depicted in FIG. 1). The communication system at least permits exchange of data between the converter stations and/or with a master controller. Nonexclusive illustrative examples of suitable communications systems include telecommunication systems, wide area networks, such as the Internet, and any combination of suitable communication systems or networks, including wired and wireless communications systems and networks.

Figure 2:
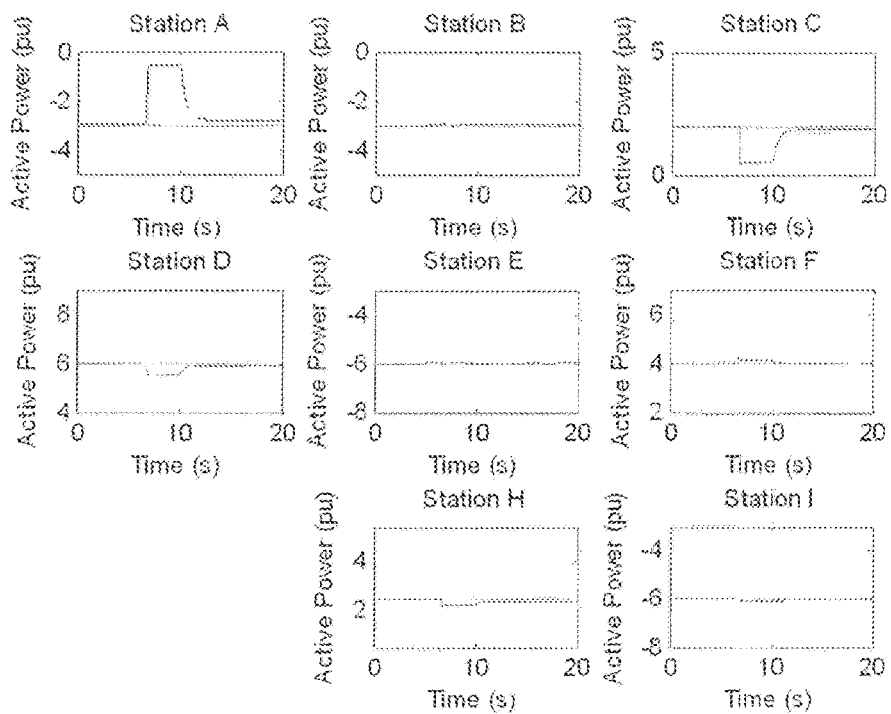
FIG. 2 illustrates power flow at the terminals of FIG. 1 following a contingency in accordance with an exemplary embodiment of the present disclosure.

FIG. 2 illustrates power flow at selected terminals of FIG. 1 following a contingency in accordance with an exemplary embodiment of the present disclosure. Namely, FIG. 2 shows the benefits of a master control following a cable loss between terminals B and C in the MTDC system of FIG. 1. The scheduled power flows can be shown as dashed lines and the actual as solid lines. Before the cable outage at time 6.7 seconds, all stations exhibit power exchange with the AC system close to scheduled values. Following the response of the local station controls which take place over a few hundreds of milliseconds, a significant deviation from schedule is exhibited, for example at stations A and C. Such large deviations could jeopardize the security of the AC system and in worst case lead to system breakup or blackouts if not corrected in a timely manner. These schedule deviations can be a result of the droop characteristic, limiter action in the local station controls as well as the voltage drop over the DC cable system. At time 10 seconds, the master control according to the disclosure is executed and new reference values can be computed for all local station controllers, dispatched and subsequently activated. As a result, the power flows for all stations return close to scheduled values.

Figure 3:
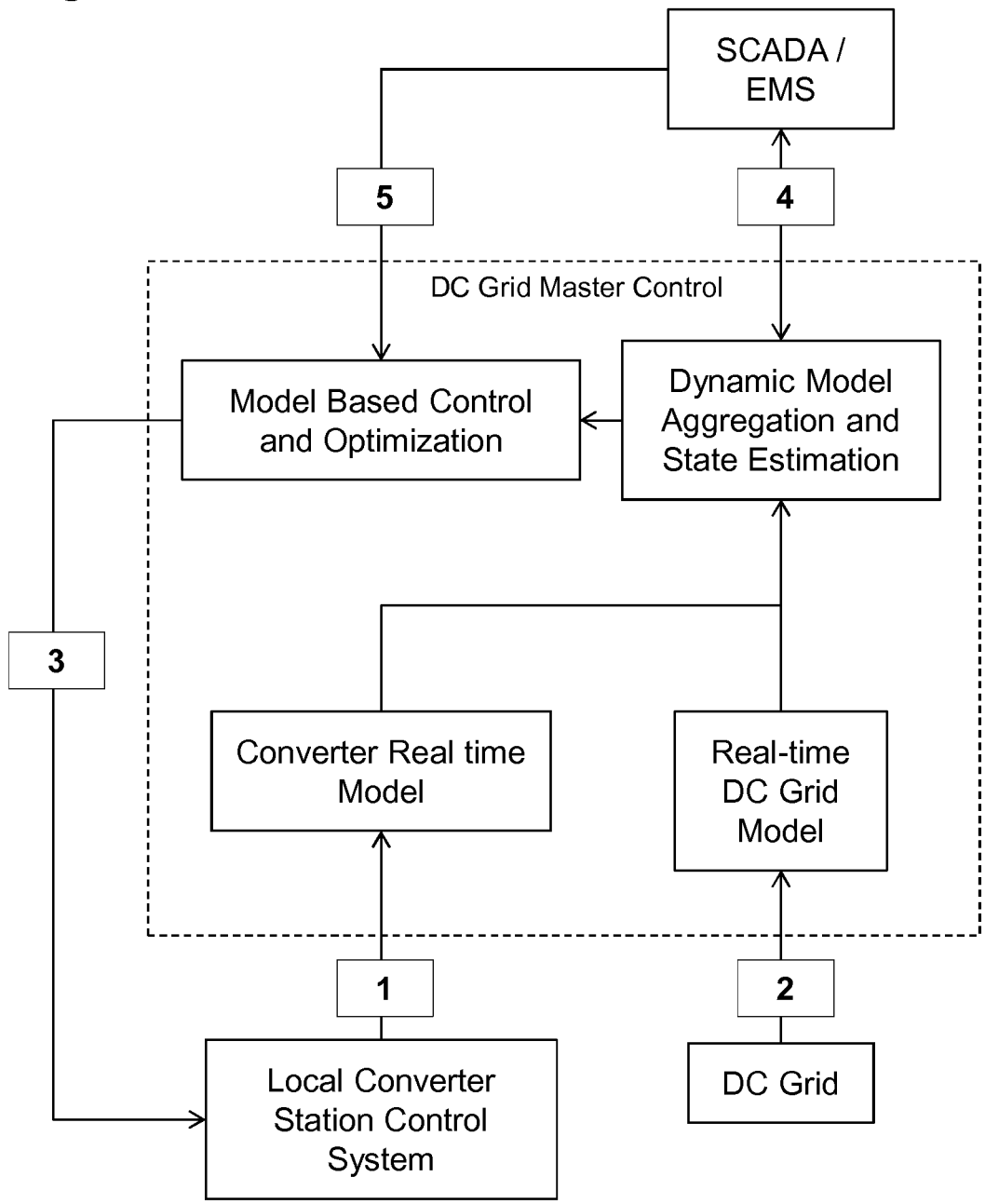
FIG. 3 illustrates an MTDC Master Control architecture with interfaces to other subsystems in accordance with an exemplary embodiment of the present disclosure.

FIG. 3 illustrates an MTDC Master Control architecture with interfaces to other subsystems in accordance with an exemplary embodiment of the present disclosure. Namely, FIG. 3 depicts the architecture of a master control layer with four main subsystems or components including: (i) Converter station real-time model, (ii) DC grid real-time model, (iii) Dynamic model aggregation and State Estimation, and (iv) Model-based control and optimization.

The converter station real-time model (i) is based on a generic representation of the converter station with its associated AC system including transformer and reactor between a Point of Common Coupling PCC and the converter AC terminal, as well as a model of the VSC converter including its control system. Suitable models can be formed on a linear ODE form with quadratic equality and inequality constraints. PMU or SCADA measurements from the AC side can be used to tune a network equivalent representing the AC grid at the PCC. The latter can be a simple Thévenin or Ward equivalent combined with Min/max limits for P, Q and Uac, or a more sophisticated equivalent including some dynamic representation of the AC grid. In a case where the master control system acts on a slow time-scale (seconds or slower) the model can also be represented in a purely algebraic manner, with its differential equations replaced by equalities.

The DC grid real-time model (ii) can be formed from off-line configuration data including for example DC line and cable parameters. Either a static or dynamic representation of the grid can be used, depending on the length of the cables and the selected response time of the supervisory control scheme. The real-time grid model can be formulated either as a purely algebraic set of equality and inequality constraints, depending on whether the time constants of the DC cables and overhead lines can be taken into account or ignored.

Real-time measurement data for the purpose of initial state estimation (iii) is expected to be time-synchronized with timestamp accuracy better than 20 ms, and will be obtained from the all converter station control systems as well as from additional sensors installed in the HVDC grid. This measurement data includes switch position data and of voltage and current measurements from the DC side of the converters throughout the full geographic reach of the system. Schedules from SCADA/EMS can be assumed to be available with an update rate of 15 minutes to 1 hour, and with a resolution of 15 sec to 15 minutes.

A number of interfaces between the abovementioned subsystems and further constituents of the MTDC system, including the corresponding exchange of signals and information, will be discussed in the following:

(1) The converter station real-time model (i) relies on the measurement signals and configuration data that is available in a local VSC HVDC station control system, including AC/DC voltages and currents, internal control system states and variables (depending on the converter controller structure, e.g. internal voltage and current references, modulation ratio etc.), Station AC/DC Grid Breaker/Isolator status, Station transformer tap changer position, Primary station control system actual control mode (for example frequency control, active power tracking or droop control, and reactive power or PCC voltage magnitude tracking).

(2) The DC grid real-time model (ii) relies on information from the DC grid including configuration data such as a static topological DC grid model, DC switch positions, voltage and current measurements from DC substations, cable or overhead line temperature estimates or measurements.

(3) The model-based control and optimization (iv) subsystem provides the following output to Converter Primary Control system adapted values of the control parameters such as gains or droop settings of the primary control system as well as power oscillation damping parameters for active damping of power oscillations, reference values (Pref, Qref, Uacref, Udcref) for each converter station, and change of primary control mode (Pcontrolmode Vdc/Pdc/maxP, and Qcontrolmode Vac/Qpcc) for respective stations.

(4) The dynamic model aggregation and State Estimation (iii) relies on the SCADA/EMS system to provide an AC equivalent system model as well as optional real-time PMU or SCADA measurements used for real-time tuning of the network equivalents or modelling of AC network constraints.

(5) The model-based control and optimization (iv) relies on the SCADA system to provide scheduled values for the converter power flows and voltage levels including a reference control mode for station (Pcontrolmode Vdc/Pdc/maxP, and Qcontrolmode Vac/Qpcc), and corresponding scheduled values for Vdc/Pdc, and Vac/Qpcc for each converter station or scheduled area interchange AreaPref (if applicable).

The master control layer can be realized as an extension to the converter station control system, with one converter control acting as master controller. If the master control system fails in one station, another converter control system takes over as master. In this way redundancy can be achieved. Alternatively, it can be included in a network management system in parallel or as part of an extended Automatic Generation Control scheme coordinating power generation in order to balance power flows between different network areas, or it can be implemented in a standalone system capable of communicating with the local station control systems and optionally also a SCADA/EMS system.

According to exemplary embodiments described herein, the MTDC master controller can include any known general purpose processor or integrated circuit such as a central processing unit (CPU), microprocessor, field programmable gate array (FPGA), Application Specific Integrated Circuit (ASIC), or other suitable programmable processing or computing device or circuit as desired. The processor can be configured to include and perform features of the exemplary embodiments of the present disclosure such as, a method of controlling a Multi-Terminal High Voltage Direct Current (MTDC) system with a plurality of terminals where each terminal includes a Voltage Source Converter (VSC) controlled by a VSC controller. The features can be performed through program code encoded or recorded on the processor, or stored in a non-volatile memory device, such as Read-Only Memory (ROM), erasable programmable read-only memory (EPROM), or other suitable memory device or circuit as desired. In another exemplary embodiment, the program code can be provided in a computer program product having a non-transitory computer readable medium, such as Magnetic Storage Media (e.g. hard disks, floppy discs, or magnetic tape), optical media (e.g., any type of compact disc (CD), or any type of digital video disc (DVD), or other compatible non-volatile memory device as desired) and downloaded to the processor for execution as desired, when the non-transitory computer readable medium is placed in communicable contact with the processor.

While the disclosure has been described in detail in the drawings and foregoing description, such description is to be considered illustrative or exemplary and not restrictive. Variations to the disclosed embodiments can be understood and effected by those skilled in the art and practising the claimed disclosure, from a study of the drawings, the disclosure, and the appended claims. In the claims, the word "comprising" does not exclude other elements or steps, and the indefinite article "a" or "an" does not exclude a plurality. A single processor or controller or other unit can fulfil the functions of several items recited in the claims. The mere fact that certain elements or steps can be recited in mutually different dependent claims does not indicate that a combination of these measures cannot be used to advantage, specifically, in addition to the actual claim dependency, any further meaningful claim combination shall be considered disclosed.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of controlling a Multi-Terminal High Voltage Direct Current (MTDC) system with at least three terminals, each terminal including a Voltage Source Converter (VSC) controlled by a VSC controller, comprising:
   providing a converter schedule including at least one of a desired power flow value and a DC voltage;
   determining, by a MTDC master controller, a present state of the MTDC system including a dynamic topology of the MTDC system;
   determining, by the MTDC master controller, based on the present state of the MTDC system, based on the schedule and based on MTDC system constraints, VSC controller parameters including droop settings for local control by the VSC controllers; and
   transmitting the VSC controller parameters to the VSC controllers.

2. The method of claim 1, wherein the present state of the MTDC system includes information about a load status of a DC link of a DC grid interconnecting the terminals.

3. A computer program product for controlling one or more processors of a master controller device in a MTDC system, the product including a non-transitory computer readable medium having program code stored thereon, which when placed in communicable contact with a processor, causes the processor to execute the method according claim 2.

4. The method of claim 1, comprising:
   determining the VSC controller parameters based on a model of at least a part of the MTDC system.

5. The method of claim 4, wherein the model includes AC equipment and/or AC grids coupled to the MTDC system.

6. A computer program product for controlling one or more processors of a master controller device in a MTDC system, the product including a non-transitory computer readable medium having program code stored thereon, which when placed in communicable contact with a processor, causes the processor to execute the method according claim 5.

7. The method of claim 4, comprising:
   determining the VSC controller parameters by way of Model Predictive Control (MPC) involving the model of the MTDC system and MTDC system constraints.

8. A computer program product for controlling one or more processors of a master controller device in a MTDC system, the product including a non-transitory computer readable medium having program code stored thereon, which when placed in communicable contact with a processor, causes the processor to execute the method according claim 7.

9. A computer program product for controlling one or more processors of a master controller device in a MTDC system, the product including a non-transitory computer readable medium having program code stored thereon, which when placed in communicable contact with a processor, causes the processor to execute the method according claim 4.

10. The method of claim 1, comprising:
    determining the VSC controller parameters at most once every thirty seconds.

11. A computer program product for controlling one or more processors of a master controller device in a MTDC system, the product including a non-transitory computer readable medium having program code stored thereon, which when placed in communicable contact with a processor, causes the processor to execute the method according claim 10.

12. The method of claim 1, comprising:
    establishing a future state of the MTDC system based on the present state and an assumed contingency;
    evaluating the future state to determine a maximum schedule deviation; and
    transmitting the maximum schedule deviation to a SCADA system supervising a DC grid interconnecting the terminals.

13. A computer program product for controlling one or more processors of a master controller device in a MTDC system, the product including a non-transitory computer readable medium having program code stored thereon, which when placed in communicable contact with a processor, causes the processor to execute the method according claim 12.

14. The method of claim 1, comprising:
    establishing a future state of the MTDC system based on the present state and an assumed contingency;
    determining converter controller set-points based on the future state; and
    transmitting the set-points to the converter controllers only upon occurrence of the contingency.

15. A computer program product for controlling one or more processors of a master controller device in a MTDC system, the product including a non-transitory computer readable medium having program code stored thereon, which when placed in communicable contact with a processor, causes the processor to execute the method according claim 14.

16. A computer program product for controlling one or more processors of a master controller device in a MTDC system, the product including a non-transitory computer readable medium having program code stored thereon, which when placed in communicable contact with a processor, causes the processor to execute the method according claim 1.

17. The method of claim 1, wherein the droop settings are determined by the MTDC master controller, the schedule deviations being distributed over several of the terminals.

18. The method of claim 1, wherein the VSC parameters are determined by the MTDC master controller by a mathematical optimization and dynamic modeling of the MTDC system including controller limits.

19. The method of claim 1, wherein a present state of the MTDC system includes indications about a load status of selected lines of a DC grid interconnecting the terminals.

20. The method of claim 19, wherein the indications about the load status of the selected lines of the DC grid include at least one of a load margin and a thermal capacity of the selected lines.

21. An MTDC master controller for controlling a Multi-Terminal High Voltage Direct Current (MTDC) system with at least three terminals, each terminal including a Voltage Source Converter (VSC) controlled by a VSC controller, the MTDC being configured to:
    determine a present state of the MTDC system including a dynamic topology of the MTDC system;
    determine VSC controller settings based on the present state of the MTDC system, a converter schedule including desired power flow values, MTDC system constraints; and
    transmit the settings to the VSC controllers.

* * * * *